(12) United States Patent
Van Holthe Tot Echten (10) Patent No.: US 10,676,285 B2
(45) Date of Patent: Jun. 9, 2020

(54) ELECTRICAL PLUG CONNECTOR FOR MOTORIZED ROLLERS

(71) Applicant: INTERROLL HOLDING AG, Sant' Antonino (CH)

(72) Inventor: Jurriaen Van Holthe Tot Echten, San't Antonino (CH)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/323,817

(22) PCT Filed: Aug. 7, 2017

(86) PCT No.: PCT/EP2017/069902
§ 371 (c)(1),
(2) Date: Feb. 7, 2019

(87) PCT Pub. No.: WO2018/029134
PCT Pub. Date: Feb. 15, 2018

(65) Prior Publication Data
US 2019/0177091 A1   Jun. 13, 2019

(30) Foreign Application Priority Data
Aug. 8, 2016 (DE) .................. 10 2016 114 672

(51) Int. Cl.
*B65G 23/08* (2006.01)
*B65G 13/06* (2006.01)
*B65G 23/22* (2006.01)

(52) U.S. Cl.
CPC ............. *B65G 23/08* (2013.01); *B65G 13/06* (2013.01); *B65G 23/22* (2013.01)

(58) Field of Classification Search
CPC ........ B65G 23/08; B65G 13/06; B65G 23/22; B65G 2812/02418; H02K 5/225
USPC ......................................................... 198/835
See application file for complete search history.

(56) References Cited

U.S. PATENT DOCUMENTS

| | | |
|---|---|---|
| 5,180,344 A | 1/1993 | Hall |
| 5,442,248 A | 8/1995 | Agnoff |
| 5,485,590 A | 1/1996 | Hyatt et al. |
| 5,530,643 A | 6/1996 | Hodorowski |
| 6,117,318 A | 9/2000 | Simonelli |

(Continued)

FOREIGN PATENT DOCUMENTS

| | | |
|---|---|---|
| AT | 508662 | 3/2011 |
| AT | 13066 | 5/2013 |

(Continued)

*Primary Examiner* — Gene O Crawford
*Assistant Examiner* — Lester III Rushin
(74) *Attorney, Agent, or Firm* — Price Heneveld LLP (57) ABSTRACT

A motor-driven conveying roller comprises a roller body which extends along a longitudinal axis, an axle element, a bearing unit for rotatably mounting the roller body in relation to the axle element, a drive motor which is arranged within the roller body and is mechanically coupled to the axle element and to the roller body for generating a torque between the axle element and the roller body, an electrical plug-in connection which is arranged in a cavity in the axle element and which comprises a plug and a socket that may be coupled to one another in a releasable manner to establish a single- to multiple-pole electrical plug-in connection, and an electrical connecting line between the electrical plug-in connection and the drive motor.

21 Claims, 3 Drawing Sheets

(56) References Cited

U.S. PATENT DOCUMENTS

| | | |
|---|---|---|
| 6,124,656 A | 9/2000 | Jensen |
| 6,200,036 B1 | 3/2001 | Girardey |
| 6,240,335 B1 | 5/2001 | Wehrung et al. |
| 6,633,278 B1 | 10/2003 | Hoegener et al. |
| 6,672,449 B2 | 1/2004 | Nakamura et al. |
| 6,701,214 B1 | 3/2004 | Wielebski et al. |
| 7,207,433 B2 | 4/2007 | Schaefer |
| 8,006,829 B2 | 8/2011 | Itoh et al. |
| 8,381,901 B2 | 2/2013 | Yamamoto |
| 8,757,363 B2 | 6/2014 | Combs et al. |
| 9,359,142 B2 | 6/2016 | Jepsen |
| 9,618,056 B2 | 4/2017 | Itoh |
| 9,731,900 B2 | 8/2017 | Ruggeri |
| 2002/0010527 A1 | 1/2002 | Wielebsi et al. |
| 2003/0168316 A1 | 9/2003 | Knepple et al. |
| 2004/0144623 A1 | 7/2004 | Newsom et al. |
| 2005/0083188 A1 | 4/2005 | Choi |
| 2006/0293782 A1 | 12/2006 | Rees |
| 2007/0197072 A1 | 8/2007 | Hvidberg et al. |
| 2008/0270427 A1 | 10/2008 | Franke et al. |
| 2010/0322473 A1 | 12/2010 | Taylor et al. |
| 2012/0024669 A1 | 2/2012 | Danelski et al. |
| 2012/0211330 A1 | 6/2012 | Ziegler |
| 2012/0175223 A1 | 7/2012 | Breen et al. |
| 2012/0175225 A1 | 7/2012 | Breen et al. |
| 2012/0259436 A1 | 10/2012 | Resurreccion et al. |
| 2012/0290126 A1 | 11/2012 | Combs et al. |
| 2013/0134017 A1 | 5/2013 | Hall et al. |
| 2013/0190915 A1 | 7/2013 | Choo et al. |
| 2014/0156063 A1 | 6/2014 | Neiser et al. |
| 2014/0277698 A1 | 9/2014 | Combs et al. |
| 2014/0326582 A1 | 11/2014 | Sakaguchi |
| 2015/0068874 A1 | 3/2015 | Jepsen et al. |
| 2015/0151921 A1 | 6/2015 | Collot |
| 2016/0080526 A1 | 3/2016 | Meyer-Graefe |
| 2016/0318714 A1 | 11/2016 | Reischl |
| 2018/0009607 A1 | 1/2018 | Tiedemann |

FOREIGN PATENT DOCUMENTS

| | | |
|---|---|---|
| CN | 2033808 U | 3/1989 |
| CN | 2199164 Y | 5/1995 |
| CN | 203682423 U | 7/2014 |
| DE | 1978258 | 2/1968 |
| DE | 3538173 | 1/1987 |
| DE | 4230729 | 3/1993 |
| DE | 69306884 | 5/1997 |
| DE | 19811130 | 9/1999 |
| DE | 102006004421 | 8/2006 |
| DE | 102006054575 | 9/2008 |
| DE | 102008053557 | 9/2009 |
| DE | 102008018205 | 12/2009 |
| DE | 202008017534 | 12/2009 |
| DE | 202009012821 | 2/2011 |
| DE | 202009012822 | 2/2011 |
| DE | 202012000793 | 4/2012 |
| DE | 102010044027 | 5/2012 |
| DE | 102011004802 | 8/2012 |
| DE | 102011109531 | 2/2013 |
| DE | 102015106026 | 8/2016 |
| DE | 102015104130 | 9/2016 |
| DE | 102015106034 | 10/2016 |
| DE | 102015106024 | 11/2016 |
| DE | 102015107167 | 11/2016 |
| DE | 102015114030 | 3/2017 |
| EP | 1021664 | 1/2002 |
| EP | 1454851 | 9/2004 |
| EP | 1656312 | 5/2006 |
| EP | 1675244 | 6/2006 |
| EP | 2369211 | 9/2011 |
| EP | 2455310 | 5/2012 |
| EP | 3212543 A1 | 9/2017 |
| JP | S5741821 | 3/1982 |
| JP | S5890447 | 5/1983 |
| JP | S59180609 | 10/1984 |
| JP | S6015308 | 1/1985 |
| JP | H05236612 | 9/1993 |
| JP | 2003026603 | 1/2003 |
| JP | 2003104534 | 4/2003 |
| JP | 2004098554 | 4/2004 |
| JP | 2014516895 | 7/2014 |
| JP | 2014142740 | 8/2014 |
| WO | 0203153 | 1/2002 |
| WO | 02098768 | 5/2002 |
| WO | 2010142029 | 12/2010 |
| WO | 2011029120 | 3/2011 |
| WO | 2012094690 | 7/2012 |
| WO | 2012113922 | 8/2012 |
| WO | 2012154650 | 11/2012 |
| WO | 2013000006 | 1/2013 |
| WO | 2013000006 A2 | 1/2013 |
| WO | 2014011459 | 1/2014 |
| WO | 2014057984 | 4/2014 |
| WO | 2016066495 A1 | 5/2016 |
| WO | 2016169982 | 10/2016 |
| WO | 2016169986 | 10/2016 |
| WO | 2016177906 | 10/2016 |
| WO | 2014178399 | 2/2017 |
| WO | 2018009607 A1 | 1/2018 |

ELECTRICAL PLUG CONNECTOR FOR MOTORIZED ROLLERS

CROSS-REFERENCE TO FOREIGN PRIORITY DOCUMENT

The present invention claims the benefit under 35 U.S.C. §§ 119(b), 119(e), 120, and/or 365(c) of PCT/EP2018/029134 filed Feb. 15, 2018, which claims priority to German Application No. 102016114672.2 filed Aug. 8, 2016.

FIELD OF THE INVENTION

The invention relates to a motor-driven conveying roller, comprising a roller body which extends along a longitudinal axis, an axle element, a bearing unit for rotatably mounting the roller body in relation to the axle element, a drive motor which is arranged within the roller body and is mechanically coupled to the axle element and to the roller body for generating a torque between the axle element and the roller body, an electrical plug-in connection which is arranged in a cavity in the axle element and which comprises a plug and a socket, which can be coupled to one another in a releasable manner, in order to establish a single- to multiple-pole electrical plug-in connection, and an electrical connecting line between the electrical plug-in connection and the drive motor.

BACKGROUND OF THE INVENTION

Motor-driven conveying rollers of the kind mentioned in the introductory part are used in numerous applications in order to convey objects such as containers, pallets, packages, items of luggage and the like. In this case, conveying rollers of this kind are used as roller drives in which the conveying line is formed by a plurality of conveying rollers which are lined up with one another and of which some are motor-operated and others are formed as idling rollers or are driven by motor-operated conveying rollers by way of belt drives or the like. Motor-operated conveying rollers can further be used as so-called drum motors in order to drive, for example, conveyor belts and for this purpose are installed as deflection rollers on one side for example.

Motor-operated conveying rollers of this kind generally have a drive motor which is arranged within the roller body, is electrically operated, and generates a torque between an axle element and a roller body. Typically, the axle element is fastened in a rack fixedly in terms of torque, and the roller body is set in rotation relative to the axle element by the torque. Here, energy is supplied to the drive motor by an electrical connection which is routed through the axle element. For this purpose, the axle element is formed as a hollow axle, so that a cable line can be laid through the axle element from the outside and can be connected to the drive motor.

In order to be able to easily replace a motor-operated conveying roller, it is known to design said electrical power supply in such a way that it can be disconnected using simple means. As a result, firstly when the motor-operated conveying roller is defective, the conveying roller can be exchanged without a great deal of expenditure in respect of the electrical connection by way of the electrical power supply being disconnected and then, after removal of the defective conveying roller and installation of a conveying roller which is in working order, said electrical power supply being correspondingly connected again. Secondly, in the event of damage to the electrical power supply, for example, if a cable is accidentally damaged or severed, said cable can be replaced in a simple manner without removal of the conveying roller being necessary for this purpose.

EP 2 161 223 already discloses a releasable electrical plug-in connection of this kind in which a plug is inserted into a socket which is arranged in the cavity in the axle element. Here, for securing purposes, the plug is either screwed to the axle element by means of a union sleeve, which is axially fixed to the plug, or secured to the axle element by means of a latching pin connection which is formed on the plug. Although the electrical plug-in connection can be released in a simple and rapid manner with this design, it has been found, firstly, that an ability to release said connection in this way, with this design has disadvantages. Firstly, the plug-in connection can be released in a simple manner, this possibly leading to erroneous installation processes due to the actions of unauthorized and inadequately trained personnel. Secondly, owing to the screw- or pin-secured connection, it is possible for liquid to pass from the surrounding area into the interior space in the roller body and into the region of the electrical plug-in connection itself. This makes it impossible to use a conveying roller which is formed in this way in regions which are exposed to moisture and, in particular, splashing water, such as in sectors of the food-processing industry in which frequent cleaning of the conveying line is necessary, for example.

For applications of this kind and for preventing mounting faults, it is known to realize an electrical terminal connection by means of a sealed-off mounting box which is installed directly on the motor-operated conveying roller or on the rack adjacent to the motor-operated conveying roller. In this case, sealed-off boxes can be used, and a design which is protected against splashing water in this respect can be achieved. However, this has the disadvantages of additional expenditure on mounting and additional space requirement in order to realize this way of mounting in a manner sealed off from splashing water. Therefore, permanent electrical supply lines are still often used in regions of the conveying lines of food-processing installations in order to supply power to motor-operated conveying rollers and/or to pass signals and/or data from sensors, such as encoders or thermal circuit breakers for example, to the outside, this having the above-described disadvantages when it is necessary to replace the conveying roller or the line cable due to damage.

The invention is based on the object of providing a motor-operated conveying roller which, in regions which are exposed to splashing water, has a more suitable electrical power supply and, in the process, improved properties in respect of mounting in comparison to the prior art.

SUMMARY OF THE INVENTION

According to the invention, this object is achieved by a motor-operated conveying roller of the kind described in the introductory part which additionally has a fastening section which is fastened to the axle element in a sealed-off manner at one end of the axle element, a clamping section which is prestressed elastically radially outward into a mounting position and, in the mounting position, describes an inside diameter which is larger than a predetermined nominal diameter of the line cable, and can be deformed elastically radially inward into an operating position and, in the operating position, describes an inside diameter which is smaller than or equal to the predetermined line diameter of the line cable, a cable bushing sleeve with an interior space for the line cable to pass through, and a clamping sleeve which is fastened in a releasable manner to the cable bushing sleeve and which can be moved between a first position in relation to the cable bushing sleeve and a second position in relation to the cable bushing sleeve, wherein, in the first position, the clamping sleeve and the cable bushing sleeve interact such that the clamping section is in the mounting position and the line cable which runs in the interior space in the cable bushing sleeve can move relative to the cable bushing sleeve, and wherein, in the second position, the clamping sleeve and the cable bushing sleeve interact such that the clamping section is in the operating position and a clamping effect is exerted on the line cable which runs in the interior space in the cable bushing sleeve, the line cable in the cable bushing sleeve being fixed against relative movement in relation to the cable bushing sleeve by said clamping effect.

The conveying roller according to the invention combines mounting-friendly electrical power supply or sensor connection with reliable sealing off from splashing water. A component in the form of a cable bushing is advantageously used for this purpose. Cable bushings are known for use in applications in which a cable has to be routed through an opening and, in the process, strain relief and scuff protection are sought. Cable bushings of various designs can be used for this application, for example, as clip-in cable bushings which can be anchored in the opening by latching means and relieve strain on and seal off the cable, which is routed through the cable gland, by latching means as well. In addition to latchable cable bushings of this kind, screwable cable bushings are also known, in which the cable bushing is anchored in the housing opening by means of a screw connection, for example, by means of an external thread which is inserted through the opening and a locking nut, and the cable line is fixed and sealed off by screwing a clamping sleeve on a cable gland sleeve. Configurations of cable bushings which are combinations of the above are known as well.

According to the invention, a cable bushing of this kind is used in order to firstly seal off the electrical plug-in connection between the plug and the bushing within the cavity in the axle element, and secondly to protect against undesired loosening. According to the invention, this is achieved by way of firstly the electrical plug-in connection being formed independently of the sealing-off arrangement and mechanical securing arrangement and being embodied by a plug and a socket within the axle element. Secondly, a cable gland is provided which, after the electrical plug-in connection is established by means of the plug and the socket, implements sealing off and securing independently of said plug-in connection by way of the cable bushing being connected firstly in a sealed-off manner to the axle element and secondly establishing a sealed-off and mechanically fixed connection to the cable line. As a result, firstly reliable sealing off of the interior space in the drum motor from the ingress of moisture and splashing water is achieved by means of the electrical plug-in connection. Secondly, direct securing of the connection between the plug and the socket can be achieved by fastening the cable bushing to the axle element. Furthermore, securing is also implemented by fixing the cable line in the cable bushing due to the rigidity of the cable line itself. According to a first preferred embodiment, provision is made for the clamping section to comprise a sealing section which fixes the line cable in the clamping section in a sealed-off manner in the operating position. According to this embodiment, a sealing function is implemented by a sealing section which is part of the clamping section. A sealing section of this kind can be embodied, for example, by an annular or cylindrical seal which is arranged in a sealing manner between the cable bushing and the outer sheath of the line cable and is pinched there. At the same time, the sealing section can implement the mechanical fixing of the cable bushing here. In particular, the sealing section can be embodied by a rubber-elastic material, for example a polyurethane hose or a silicone hose.

According to a further preferred embodiment, provision is made for the fastening section to be formed on the cable bushing sleeve. According to this embodiment, the cable bushing sleeve is fastened to the axle element, for example, by way of the cable bushing sleeve being screwed into an internal thread of the axle element by means of an external thread which is formed on said cable bushing sleeve. The internal thread can be formed in the wall of the cavity in which the plug/socket connection is positioned. As an alternative, the cable bushing sleeve can be screwed onto an external thread of the axle element by means of an internal thread which is formed on said cable bushing sleeve or can be fastened to the axle element by means of a latching connection or a non-positive press-fit connection.

According to a further preferred embodiment, provision is made for the clamping section to be formed on the cable bushing sleeve. According to this embodiment, the clamping section is arranged integrally on the cable bushing sleeve or as a separate component, as a result of which the cable line is mechanically fixed and possibly sealed off at the cable bushing sleeve. This embodiment can, in particular, be combined with the embodiment outlined above in which the fastening section is also arranged on the cable bushing sleeve, as a result of which force is transmitted directly from the axle element, via the cable bushing sleeve, to the cable line. In principle, it is understood that this configuration is preferred but, as an alternative, other configurations in which the fastening section and/or the clamping section are formed on the clamping sleeve can likewise be advantageous for other applications.

Preference is further given to the axle element having a first axle section which is surrounded by the roller body or an end cap which is fastened to the roller body and a second axle section which projects out of the roller body or the end cap for fastening the axle element to a conveying roller frame, wherein the bearing unit is fastened to the first axle section and the fastening section of the cable bushing is fastened to the second axle section. According to this embodiment, the axle element is arranged partially within the roller body or an end cap which is connected to said roller body and partially outside the roller body or the end cap, that is to say, projects laterally. It is understood here that this configuration serves for the motor-operated conveying roller to be able to be fastened in a laterally arranged rack by means of the axle element, and for the roller body to be rotatably mounted on the axle element. This configuration can also be implemented by an end cap which is inserted into the roller body and in which the bearing unit is arranged. An end cap of this kind can firstly run flush or substantially flush with the end of the roller body, but can also be configured such that the end cap extends beyond the roller body in the longitudinal direction and consequently extends said roller body. In this case, the axle element can be arranged in such a way that it is arranged partially within the end cap and here also receives the bearing unit for rotatable mounting and the axle element extends outward beyond the end cap. Owing to this configuration, good accessibility can furthermore be achieved in the axial direction in order to be able to mount the electrical plug-in connection and to provide securing and sealing off using the cable bushing.

According to a yet further embodiment, provision is made for the clamping sleeve to be connected to the cable bushing sleeve by means of a releasable latching connection and to be able to be moved out of the second position into the first position by way of the clamping sleeve being latched to the cable bushing sleeve. According to this embodiment, the clamping sleeve and the cable sleeve are connected to one another by a latching connection which is releasable. This can be embodied, for example, by elastically resilient latching hooks which engage into an undercut, and also a bayonet fitting can be provided as the latching connection, in which bayonet fitting an interlocking connection is implemented between the clamping sleeve and the cable bushing sleeve by a sequence comprising a translatory and a rotary movement. With preference, the latching connection cannot be released using a standard tool, such as a wrench, in order to prevent unauthorized mounting processes at the electrical plug-in connection in this way. Therefore, for example, a system tool, which is a separate constituent part of the conveying roller according to the invention, can be inserted into an opening in the cable bushing and in this way release the latching connection for removal purposes.

According to a preferred embodiment, which constitutes an alternative to the above, provision is made for the clamping sleeve to be connected to the cable bushing sleeve by means of a threaded connection and to be able to be moved out of the second position into the first position by way of the clamping sleeve being screwed onto the cable bushing sleeve or being screwed into the cable bushing sleeve. According to this embodiment, the connection between the clamping sleeve and the cable bushing sleeve is implemented by a screw connection, for example by way of an external thread being formed on the cable bushing sleeve, it being possible for a corresponding internal thread of the clamping sleeve to be screwed onto said external thread. In this embodiment, the clamping sleeve can be embodied, for example, as a nut which can be screwed on and tightened by means of an external hexagon and which has, for example, an inner, tapering, for example conical, circumferential section which serves to deform a clamping section on the cable bushing sleeve radially inward during the screwing-on operation in order to exert the clamping effect and sealing effect onto the line cable in this way. This embodiment is particularly preferred when the cable bushing sleeve is also fastened on the axle elements by means of a thread. In principle, it is understood that the threaded connection between the clamping sleeve and the cable bushing sleeve can also be embodied on the clamping sleeve by means of an external thread which is screwed into an internal thread on the cable bushing sleeve. In this case, for example, the clamping section can be formed on the clamping sleeve, and the clamping can be implemented by way of a tapering, for example conical, outer surface of the clamping sleeve, by being screwed to the cable bushing sleeve, implementing radially inwardly directed pressing of a clamping section or a corresponding conical inner circumferential surface on the cable bushing sleeve radially inwardly deforming a clamping section on the clamping sleeve when the clamping sleeve is screwed into the cable bushing sleeve.

According to a further preferred embodiment, provision is made for the clamping section to comprise a tapering, for example conical, circumferential surface, an opposing circumferential surface and an elastically deformable sealing element which is deformed radially inward by an axial movement of the clamping sleeve relative to the cable bushing sleeve from the first position into the second position by way of the conical circumferential surface being pressed against the opposing circumferential surface. According to this embodiment, the clamping and possibly sealing effect of the cable bushing is implemented by way of two surfaces being pressed against one another when the clamping sleeve is moved from the first position into the second position in relation to the cable bushing sleeve. It is understood here that the tapering, for example conical, circumferential surface or the opposing circumferential surface can be formed on the clamping sleeve and accordingly the opposing circumferential surface or the tapering, for example conical, circumferential surface can be formed on the cable bushing sleeve, wherein in each case one of the two circumferential surfaces is formed on one of the two components in order to achieve the interaction. Owing to the design of a tapering, for example conical, circumferential surface, an axial movement between the clamping sleeve and the cable bushing sleeve can be converted into a radially inwardly acting clamping force and the cable line can be clamped and possibly sealed off in the clamping section in this way.

In this case, it is particularly preferred when the tapering circumferential surface is formed, as inner circumferential surface, in particular as inner cone surface, on the clamping sleeve or on the cable bushing sleeve and the opposing circumferential surface is accordingly formed, as outer circumferential surface, on the cable bushing sleeve or on the clamping sleeve, or the tapering circumferential surface is formed, as outer circumferential surface, in particular as outer cone surface, on the clamping sleeve or on the cable bushing sleeve and the opposing circumferential surface is accordingly formed, as inner circumferential surface, on the cable bushing sleeve or on the clamping sleeve. According to these two alternative embodiments, a construction of the clamping section of high quality in respect of manufacture which can be produced in an efficient manner is achieved on the cable bushing, it being possible for reliable sealing off and clamping of a cable line in the cable bushing to be achieved with this construction. It is understood here that the two variants can be combined, in particular, with a manner of connection between the cable bushing sleeve and the clamping sleeve, as described above, by way of a latching effect or a screw connection being implemented between the cable bushing sleeve and the clamping sleeve.

According to a further preferred embodiment, provision is made for the clamping section to comprise a plurality of elastically inwardly deformable fingers and a sealing ring which is arranged radially inward with respect to the fingers. Effective clamping of a cable line, which runs through the cable bushing, can be achieved by a plurality of fingers being formed, which fingers preferably extend in the axial direction or at least with an axial directional component and are elastically radially inwardly deformable. In particular, a wide clamping region can be achieved by a configuration of this kind when the fingers are arranged at a circumferential distance in relation to one another, it being possible for cable lines out of a diameter range to be clamped and effectively sealed off by said wide clamping region. It is understood here that, in particular, forming the clamping section with radially inwardly deformable fingers of this kind can be combined with a rubber-elastic sealing sleeve which is arranged radially inwardly from the fingers in the cable bushing and is pressed radially inwardly against the cable line owing to the deformation of the fingers. In this case, particularly good interaction is achieved when the fingers are formed from a hard plastic and the sealing element, in contrast, is formed from a material with a higher elasticity.

According to a yet further preferred embodiment, provision is made for the cable bushing sleeve to have a first axial end which is fastened to the axle element and a second axial end which is situated opposite the first axial end and to which the clamping sleeve is fastened, and for a sealing element to seal off the clamping sleeve from the axle element in the operating position. In this embodiment, the cable bushing sleeve, by way of one end, is fastened to the axle element and the clamping sleeve is fastened to the cable bushing sleeve at an opposite end. Provision is made here for the clamping sleeve to have a sealing element which directly implements a sealing effect between the clamping sleeve and the axle element when the clamping sleeve is in the second position, that is to say in the operating position. Direct sealing off between the clamping sleeve and the axle element is implemented in this way, so that ingress of moisture into the region between the clamping sleeve and the cable bushing sleeve is effectively prevented, and separate sealing off firstly of the clamping sleeve in relation to the cable bushing sleeve and secondly of the cable bushing sleeve in relation to the axle element can be dispensed with. It is understood that this configuration is particularly effective when the clamping section is likewise formed at the axial end to which the clamping sleeve is fastened, so that both sealing off between the clamping sleeve and the axle element and also sealing off between the cable bushing and the line cable are implemented from this end. It is understood here that the clamping sleeve is mounted from this end, but the sealing plane does not necessarily have to be situated at the axial end, but rather can also be shifted, by the mounting process, inward in the direction of that end at which the cable bushing sleeve is connected to the axle element.

It is yet further preferred here when the sealing element is pressed axially between the clamping sleeve and the axle element, when the clamping sleeve is in the second position relative to the cable bushing sleeve. According to this embodiment, axial pressing of the sealing element and, therefore, effective sealing off are implemented by way of the clamping sleeve being moved to the second position. This movement of the clamping sleeve can be embodied, for example, by an axial, translatory sliding movement for achieving a latching effect, by a combined translatory and rotary movement between the clamping sleeve and the cable bushing sleeve in order to implement bayonet fitting-like fastening, or by means of a screw connection of the clamping sleeve to the cable bushing sleeve.

According to a yet further preferred embodiment, provision is made for the fastening section to be fastened to the axle element in a sealed-off manner. According to this embodiment, separate sealing off of the fastening section is provided, this reliably preventing ingress of moisture through this fastening region. This fastening can be implemented, for example, by means of a rubber-elastic sealing ring, such as an O-ring, or can be implemented by a screw-connection of the cable bushing sleeve to the axle element using a permanent elastic or curing sealing compound which is arranged in the thread.

Finally, according to a further preferred embodiment, provision is made for the plug connection to have multiple poles and the plug or the socket to have a plurality of contacts which are arranged in axially projecting contact protrusions which are brought into electrical contact with contacts on the socket or the plug, which contacts are arranged in corresponding contact recesses, wherein one of the plurality of contacts is formed on a contact protrusion which is different from the other contact protrusions, in particular, it has a different axial cross section and/or a different axial length in relation to the other contact protrusions and interacts with correspondingly matching contact recesses which are different from the others, wherein electrical ground is preferably applied to the different contact. This embodiment achieves an unambiguous assignment of the connection between the plug and the socket with respect to a rotation about the longitudinal axis, that is to say, a plug-in connection which is protected against polarity reversal. In this case, the different contact can be surrounded, for example, by a right-angled contact protrusion, whereas the other contacts are surrounded by contact protrusions of round cross section. The contact protrusion can, in particular, additionally provide an electrical insulator effect.

A further aspect of the invention is an electrical plug-in connection for being arranged in a cavity in an axle element of a motor-operated conveying roller, comprising a plug and a socket, which can be coupled to one another in a releasable manner, in order to establish a single- to multiple-pole electrical plug-in connection, characterized by a cable bushing, comprising a fastening section which is fastened to the axle element at one end of the axle element, a clamping section which is prestressed elastically radially outward into a mounting position and, in the mounting position, describes an inside diameter which is larger than a predetermined nominal diameter of the line cable, and can be deformed elastically radially inward into an operating position which is smaller than or equal to the predetermined line diameter of the line cable, a cable bushing sleeve with an interior space for the line cable to pass through, and a clamping sleeve which is fastened in a releasable manner to the cable bushing sleeve and which can be moved between a first position in relation to the cable bushing sleeve and a second position in relation to the cable bushing sleeve, wherein, in the first position, the clamping sleeve and the cable bushing sleeve interact such that the clamping section is in the mounting position and the line cable which runs in the interior space in the cable bushing sleeve can move relative to the cable bushing sleeve, and wherein, in the second position, the clamping sleeve and the cable bushing sleeve interact such that the clamping section is in the operating position and a clamping effect is exerted on the line cable which runs in the interior space in the cable bushing sleeve, the line cable in the cable bushing sleeve being fixed against relative movement in relation to the cable bushing sleeve by said clamping effect.

This electrical plug-in connection is suitable, in particular, for being used for motor-operated conveying rollers and here for providing firstly reliable electrical connection and secondly reliable sealing off against ingress of splashing water and moisture. In principle, it is understood that the electrical plug-in connection according to this aspect of the invention can be developed in accordance with the developments outlined above of the electrical plug-in connection and the cable bushing for it. It is understood here that the corresponding developments in respect of the electrical plug-in connection have the same functionalities, variants and advantages as have been described above in respect of the motor-operated conveying roller.

BRIEF DESCRIPTION OF THE DRAWINGS

A preferred embodiment will be described with reference to the appended figures, in which.

DETAILED DESCRIPTION OF THE EMBODIMENTS

Figure 1:
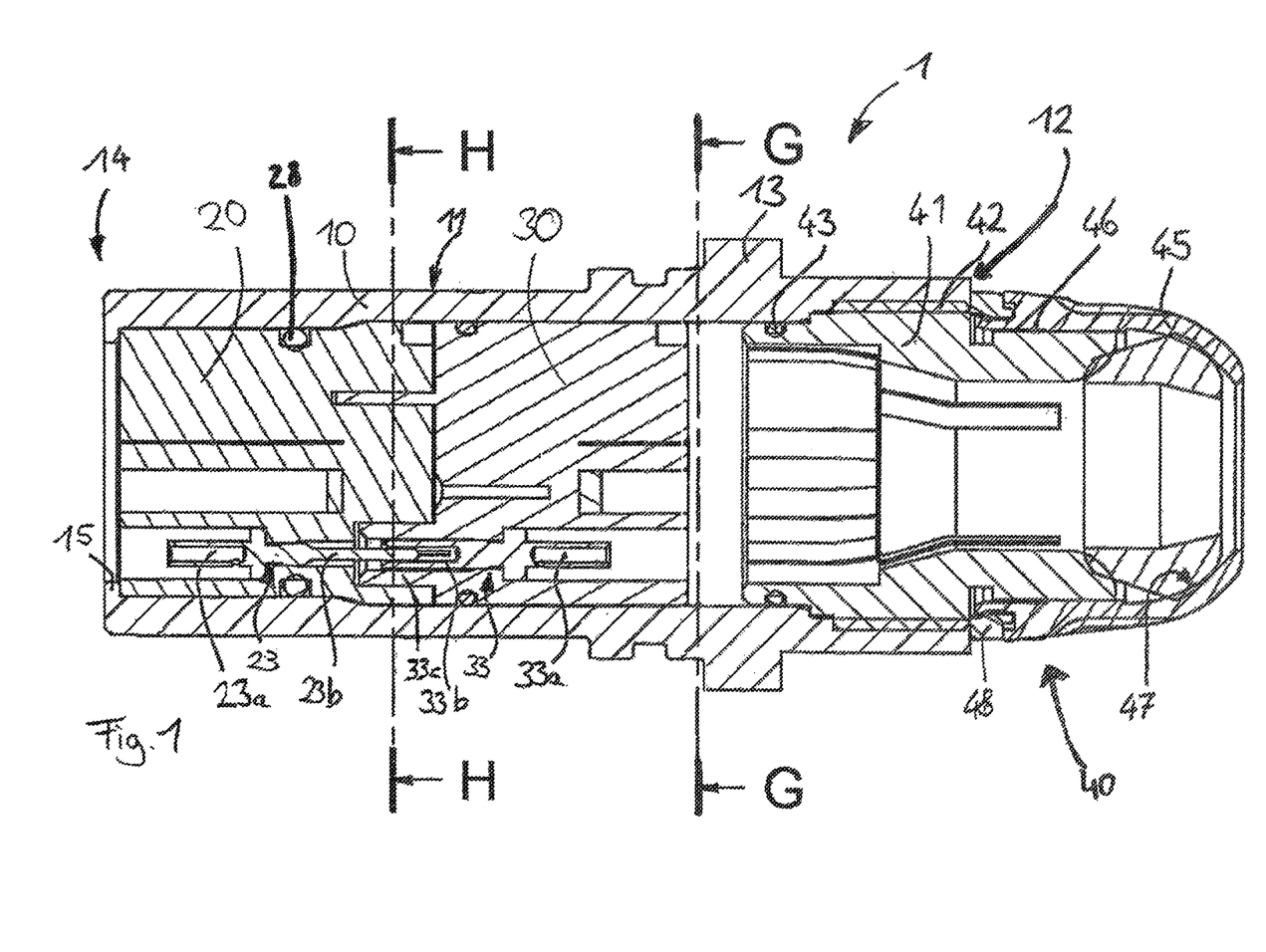
FIG. 1 is a side view of a longitudinal cross section through an axle element with an electrical plug-in connection in line with a preferred embodiment according to the invention.

FIG. 1 shows an axle element 10 which is in the form of a hollow axle and has a cylindrical outer circumferential surface 11 which has, adjacent to the right-hand-side outer end 12, an encircling collar 13, the outside diameter of which is larger than the outside diameter of the circumferential surface of the axle element 10 in the region to the left and to the right of the collar 13.

The axle element 10 has a multiple stepped, cylindrical interior space in which an axially extending passage in which various components are arranged and fastened is formed. An inwardly projecting, encircling shoulder 15, which has the smallest inside diameter of the entire passage, is arranged at the inner left-hand-side end 14 of the axle element 10. All of the components which are arranged in the interior space in the axle element 10 are, therefore, inserted from the outer, right-hand-side end 12 during the course of mounting and are lined up with one another in the interior space.

An electrical plug element 20 is arranged immediately adjacent to the shoulder 15 at the inner end 14. The electrical plug element 20 comprises a total of nine pins, including pins 21-27, which are arranged in bores in the plug element 20 and distributed over the circumference. Each pin 21-27 has, on its section which faces the inner end 14, a sleeve section 23a which can be connected, for example, soldered or pressed, to an end of a cable, which end is stripped of insulation for reliable electrical connection. Each contact pin 21-27 has, on its section which faces the outer end 12, a pin section 23b, which can be electrically connected to a corresponding contact sleeve 33 of a socket 30. The plug element 20 is fastened in a sealed-off manner in the axle element 10 by means of an encircling O-ring 28 which is arranged approximately centrally in the axial direction and is held in the axle element by way of its outer circumference by a frictional connection.

Figure 2:
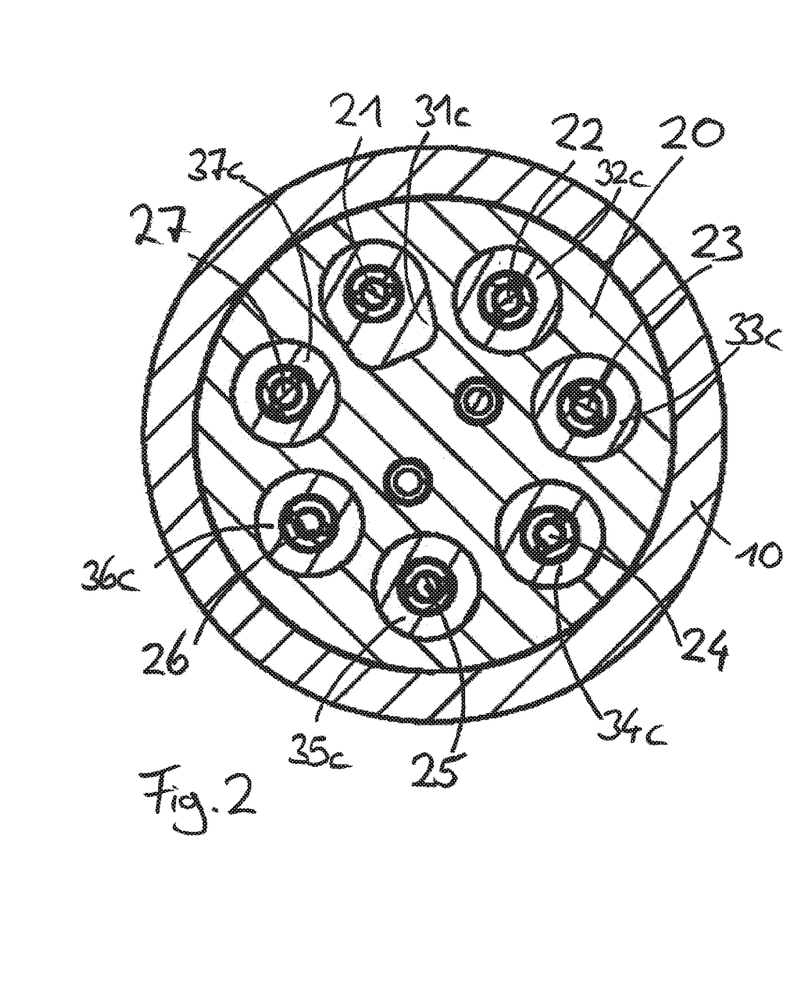
FIG. 2 is a cross section along line H-H in FIG. 1.
Figure 3:
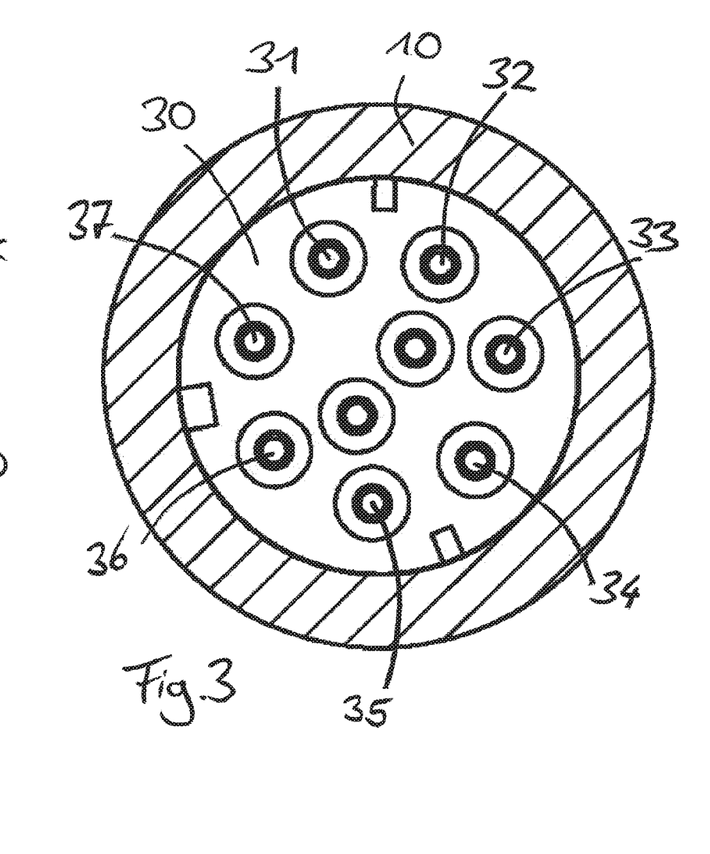
FIG. 3 is a cross section along line G-G in FIG. 1.

The socket 30 has a multiple-pole pattern of nine contact sockets, including contact sockets 31-37, which are distributed over the circumference and correspond to the arrangement of the seven contact pins 21-27 of the plug element 20. Each of the seven contact sockets 31-37 has, on that section which faces the inner end 14 of the axle element, a contact sleeve section 33b which has an inside diameter which can produce a frictional and electrically reliable connection to a pin section 32b of the plug element in each case. Each contact sleeve section is surrounded, at that end surface of the socket element 30 which faces the inner end, by an insulating sheath 33c which projects a short distance beyond the end surface of the socket element. Six of the contact sleeve sections project, together with their insulating sheath 32c-37c, a corresponding distance in the axial direction, whereas one of the contact sleeve sections has an insulating sheath 31c which has an axial cross section which differs from the other insulating sheaths on account of it not being cylindrical but rather non-circular with an externally rounded and internally rectangular contour. Said insulating sheath 31c and said contact socket 31b which is arranged in said insulating sheath 31c fit only into one, single, correspondingly shaped recess 21c in the plug element 20 and can, therefore, be joined only to a corresponding contact pin 21, which is arranged in this correspondingly formed recess, for an electrical plug-in connection. The differently shaped insulating sheath 31c projects by a greater distance in the axial direction than the other six insulating sheaths 32c-37c. Owing to this configuration, when joining the plug element 20 and the socket element 30, it is only possible to connect the plug element and the socket element to one another with a single angular orientation, and this angular orientation can be found in a simple manner by a fitter on the basis of the further axial protrusion of the specifically shaped insulating sheath 31c around the contact socket 31.

Each contact socket 31-37 in turn has, at its end which faces the outer end 12 of the axle element 10, a sleeve section 33a which can be electrically reliably connected to an end of a cable, which end is stripped of insulation, for pressing.

The nine-core cable line, which is connected to the socket 30 from the outside, passes through a cable bushing 40 which extends coaxially in relation to the axle element 10. The cable bushing 40 comprises a cable bushing sleeve 41 which is screwed by means of an external thread 42 into a corresponding internal thread on the outer end 12 of the axle element 10. The cable bushing sleeve 41 is sealed off in relation to the axle element 10 at the inner circumferential surface of said axle element 10 by means of a sealing ring 43 which is situated inward from said external thread 42, so that no liquid can pass through between the cable bushing sleeve 41 and the axle element 10.

The cable bushing sleeve 41 extends out of the outer end 12 of the axle element 10. A clamping sleeve 45 is fastened on that section of the cable bushing sleeve 41 which extends out. The clamping sleeve 45 is fastened by means of a screw arrangement 46. To this end, the clamping sleeve 45 has an internal thread which interacts with an external thread of the cable bushing sleeve 41. In order to prevent bacteria collecting in gaps or capillaries between the clamping sleeve 45 and the outer end of the cable bushing sleeve 41, a ring seal 48 is located at the axial, axle element-facing end of the clamping sleeve, in addition to the sealing ring 43.

By way of screwing the clamping sleeve 45 onto the cable bushing sleeve 41, a radially inwardly rounded, tapering section 47 is brought into interaction with the outwardly projecting section of the cable bushing sleeve 41. The outwardly projecting section of the cable bushing sleeve 41 is deformed radially inward as a result and clamps the cable line which runs in this region. This clamping effect can be supplemented by a sealing effect by way of a hose section composed of a rubber-elastic material being arranged radially inward from the deforming section of the cable bushing sleeve 41, said hose section bearing in a sealing manner against the inner circumferential surface of the cable bushing sleeve 41 in said radially inwardly deforming region and also in a close-fitting manner are against the outer circumferential surface of the cable line in this region when the radial inward deformation takes place. Reliable clamping and sealing off of the cable line in the cable bushing 40 is achieved in this way. It is understood that the clamping and sealing effect of the cable bushing 40 can be achieved, for example, in accordance with the configuration which is described in DE102008018205B4, DE202008017534U1, EP1675244B1 or EP2369211A2, the disclosure content of said documents accordingly being incorporated herein in their entirety.

The clamping sleeve 45 has, at its axial end which faces the axle element 10, an encircling ring seal 48 which, when the clamping sleeve 45, is screwed onto the cable bushing sleeve 41, is pressed axially against the end side of the axle element at the outer end 12. As a result, further sealing off between the clamping sleeve 45 on the one hand and the axle element 10 on the other hand is directly implemented and the resistance to splashing water is further increased.

The cylindrical interior space in the axle element consists of four axially spaced-apart, different cylindrical regions which merge with one another by way of short transition bevels (chamfers). The diameters of these cylindrical regions decrease from the outer end 12 in the axial direction toward the inside. The sealing ring 43 provides sealing off over a larger diameter than the seal of the socket element 30, and this seal, in turn, provides sealing off over a larger diameter than the seal 28. As a result, the movements of the individual sealing rings in the pressed state, during the course of mounting of the socket parts, are kept as low as possible and secure joining of the electrical contacts which are situated deep in the hollow axle is rendered possible.

An additional EMC element can be mounted in the extended cylindrical recess in the cable bushing sleeve 41, that implementing electrical contact between the cable bushing sleeve 41 and an additional shield of the cable in order to achieve electromagnetic shielding, as described in DE102008018205B4, for example.

Figure 4:
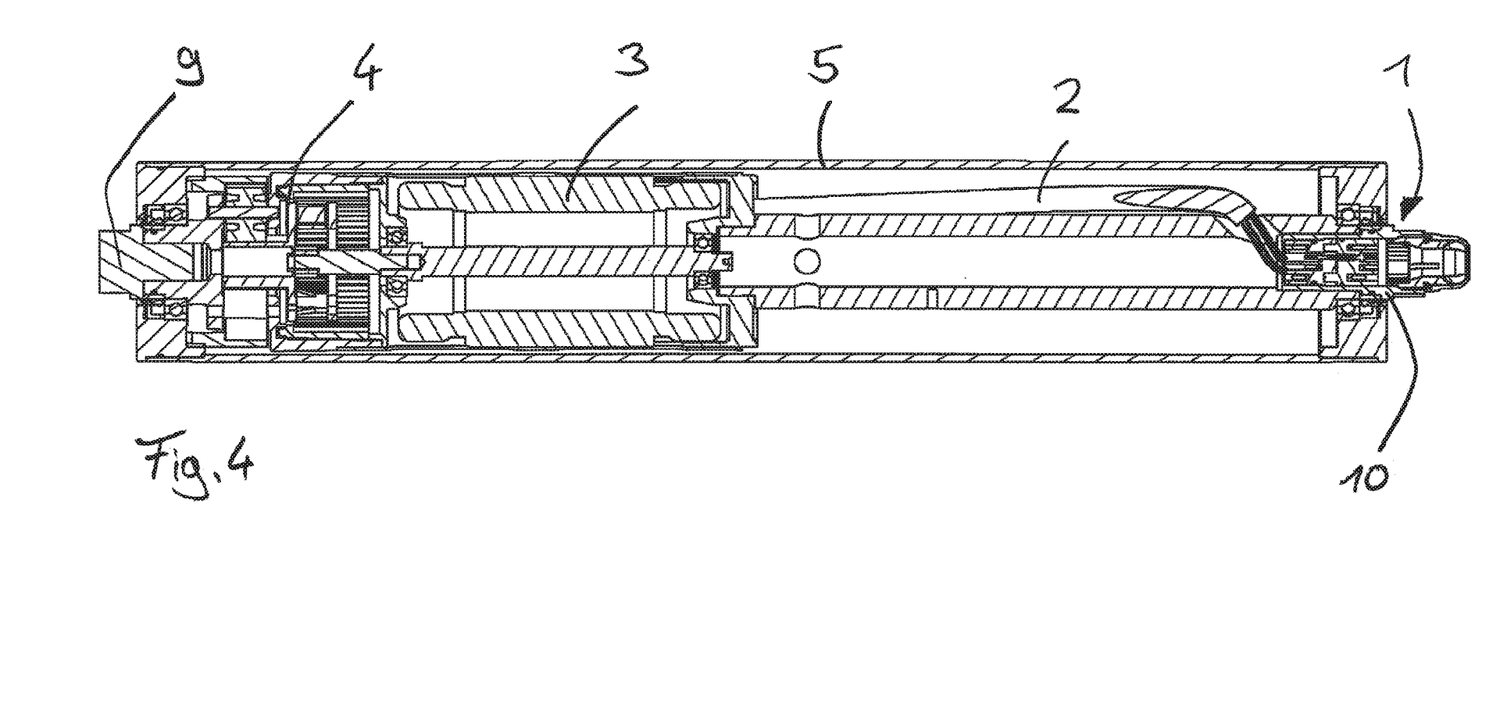
FIG. 4 is a view of a motor-operated conveying roller with an axle element according to figure formed at the right-hand-side end of said conveying roller

FIG. 4 shows an overall view of a motor roller according to the invention in an illustration through a longitudinal section. The motor roller comprises an electric motor 3 which is connected to a planetary gear mechanism 4. The planetary gear mechanism 4 and the motor 3 are arranged within a roller body 5. A left-hand-side axle element 9 and a right-hand-side axle element 10 protrude out of the roller body 5 at the end sides. The roller body 5 is rotatably mounted in relation to the axle elements 9, 10, and the motor 3 with the gear mechanism 4 generates a drive torque between the axle elements 9, 10 on the one hand and the roller body 5 on the other hand.

The electrical power supply to and actuation of the motor 3 are performed by means of an electrical line 2. The electrical line 2 is connected by way of an electrical plug-in connection to the cable bushing 1 which is arranged in the right-hand-side axle element and fastened on it. The electrical line 2 runs out of a terminal, which runs coaxially in relation to the rotation axis, to the electrical plug-in connection within the axle element 10 through a radial opening in an axle into a radially outwardly arranged eccentric position within the roller body 5 and is eccentrically connected to the motor 3.

The invention claimed is:

1. A motor-driven conveying roller comprising:
   a roller body extending along a longitudinal axis;
   an axle element;
   a bearing unit for rotatably mounting the roller body in relation to the axle element;
   a drive motor disposed within the roller body and mechanically coupled to the axle element and to the roller body for generating a torque between the axle element and the roller body;
   an electrical plug-in connector disposed in a cavity in the axle element comprising a plug and a socket that may be coupled to one another in a releasable manner to establish a single-pole or multiple-pole electrical plug-in connection;
   an electrical connecting line extending between the electrical plug-in connector and the drive motor; and
   a cable bushing, wherein the cable bushing further comprises:
     a fastening section sealingly fastened to the axle element at one end of the axle element;
     a clamping section having a mounting position and operating position, wherein the clamping section is prestressed elastically radially outward to define an inside diameter larger than a predetermined nominal diameter of a line cable when in the mounting position and is deformable elastically radially inward to define the inside diameter smaller than or equal to the predetermined line diameter of the line cable when in the operating position;
     a cable bushing sleeve having an interior space through which the line cable may pass; and
     a clamping sleeve releasably fastened to the cable bushing sleeve and moveable between a first position in relation to the cable bushing sleeve and a second position in relation to the cable bushing sleeve;
       wherein, in the first position, the clamping sleeve and the cable bushing sleeve interact such that the clamping section is in the mounting position and the line cable passing through the interior space in the cable bushing sleeve can move relative to the cable bushing sleeve; and
       wherein, in the second position, the clamping sleeve and the cable bushing sleeve interact such that the clamping section is in the operating position and a clamping effect is exerted on the line cable passing through the interior space in the cable bushing sleeve, the line cable in the cable bushing sleeve being fixed against relative movement in relation to the cable bushing sleeve by the clamping effect.

2. The conveying roller as claimed in claim 1, wherein the clamping section comprises a sealing section that sealingly fixes the line cable in the clamping section when in the operating position.

3. The conveying roller as claimed in claim 1, wherein the fastening section is formed on the cable bushing sleeve.

4. The conveying roller as claimed in claim 1, wherein the clamping section is formed on the cable bushing sleeve.

5. The conveying roller as claimed in claim 1, wherein the axle element further comprises:
   a first axle section surrounded by the roller body or an end cap fastened to the roller body; and
   a second axle section projecting out of the roller body or the end cap for fastening the axle element to a conveying roller frame;
   wherein the bearing unit is fastened to the first axle section and the fastening section of the cable bushing is fastened to the second axle section.

6. The conveying roller as claimed in claim 1, wherein the clamping sleeve is connected to the cable bushing sleeve by a releasable latching connection and is displaced from the second position to the first position by unlatching the clamping sleeve from the cable bushing sleeve.

7. The conveying roller as claimed in claim 1, wherein the clamping sleeve is connected to the cable bushing sleeve by a threaded connection and is displaced from the second position to the first position by unscrewing the clamping sleeve from the cable bushing sleeve.

8. The conveying roller as claimed in claim 7, wherein the clamping sleeve comprises internal threads threadingly attached to external threads disposed on the cable bushing sleeve.

9. The conveying roller as claimed in claim 7, wherein the clamping sleeve comprises external threads threadingly attached to internal threads disposed on the cable bushing sleeve.

10. The conveying roller as claimed in claim 1, wherein the clamping section comprises a tapering circumferential surface, an opposing circumferential surface, and an elastically deformable sealing element which is deformed radially inward by an axial movement of the clamping sleeve relative to the cable bushing sleeve from the first position into the second position by way of the tapering circumferential surface being pressed against the opposing circumferential surface.

11. The conveying roller as claimed in claim 10, wherein: the tapering circumferential surface is formed as an inner circumferential surface on the clamping sleeve or on the cable bushing sleeve and the opposing circumferential surface is formed as an outer circumferential surface on the cable bushing sleeve or on the clamping sleeve.

12. The conveying roller as claimed in claim 10, wherein: the tapering circumferential surface is formed as an outer circumferential surface on the clamping sleeve or on the cable bushing sleeve and the opposing circumferential surface is formed as an inner circumferential surface on the cable bushing sleeve or on the clamping sleeve.

13. The conveying roller as claimed in claim 1, wherein the clamping section comprises a plurality of elastically inwardly deformable fingers and a sealing ring arranged radially inward with respect to the fingers.

14. The conveying roller as claimed in claim 13, wherein the sealing element is pressed axially between the clamping sleeve and the axle element when the clamping sleeve is the second position relative to the cable bushing sleeve.

15. The conveying roller as claimed in claim 1, wherein the cable bushing sleeve comprises a first axial end fastened to the axle element and a second axial end situated opposite the first axial end and to which the clamping sleeve is fastened, and a sealing element that seals off the clamping sleeve from the axle element in the operating position.

16. The conveying roller as claimed in claim 1, wherein the fastening section is fastened to the axle element in a sealed-off manner.

17. The conveying roller as claimed in claim 1, wherein the plug connection comprises multiple poles and the plug or the socket comprise a plurality of contacts arranged as axially projecting contact protrusions that are adapted to establish electrical contact with a plurality of corresponding contact recesses arranged on the other of the socket or the plug, and wherein one of the plurality of projecting contact protrusions has a different axial cross section and/or a different axial length in relation to a one of the other of the plurality of projecting contact protrusions, and interacts with a one of the plurality of correspondingly contact recesses that is different from the other of the plurality of corresponding contact recesses.

18. The conveying roller as claimed in claim 17, wherein an electrical ground is applied through the one of the plurality of projecting contact protrusions and the one of the plurality of correspondingly contact recesses.

19. An electrical plug-in connection disposed in a cavity of an axle element of a motor-operated conveying roller, the electrical plug-in connection comprising:
a plug and a socket operably coupled to one another in a releasable manner to establish a single-pole or a multiple-pole electrical plug-in connection; and
a cable bushing further comprising:
a fastening section fastened to the axle element at one end of the axle element;
a clamping section that is prestressed elastically radially outward into a mounting position and, in the mounting position, describes an inside diameter which is larger than a predetermined nominal diameter of a line cable, and can be deformed elastically radially inward into an operating position that is smaller than or equal to the predetermined line diameter of the line cable,
a cable bushing sleeve with an interior space for the line cable to pass through; and
a clamping sleeve releasably fastened to the cable bushing sleeve moveable between a first position in relation to the cable bushing sleeve and a second position in relation to the cable bushing sleeve,
wherein in the first position, the clamping sleeve and the cable bushing sleeve interact such that the clamping section is in the mounting position and the line cable which runs in the cavity of the cable bushing sleeve can move relative to the cable bushing sleeve, and
wherein in the second position, the clamping sleeve and the cable bushing sleeve interact such that the clamping section is in the operating position and a clamping effect is exerted on the line cable which runs in the cavity of the cable bushing sleeve, the line cable in the cable bushing sleeve being fixed against relative movement in relation to the cable bushing sleeve by the clamping effect.

20. The electrical plug-in connection as claimed in claim 19, wherein the clamping section comprises an elastically deformable sealing element that is deformed radially inward by an axial movement of the clamping sleeve relative to the cable bushing sleeve from the first position into the second position by way of a tapering circumferential surface being pressed against an opposing circumferential surface.

21. A motor-driven conveying roller comprising:
a roller body extending along a longitudinal axis;
an axle element;
a bearing unit rotatably mounting the roller body in relation to the axle element;
a drive motor disposed within the roller body and mechanically coupled to the axle element and to the roller body for generating a torque between the axle element and the roller body;
an electrical plug-in connector disposed in a cavity in the axle element comprising a plug and a socket that may be coupled to one another in a releasable manner to establish a single-pole or multiple-pole electrical plug-in connection;
an electrical connecting line extending between the electrical plug-in connector and the drive motor;
a cable bushing fastening section sealingly fastened to the axle element at one end of the axle element;
a cable bushing clamping section having a mounting position and operating position, wherein the clamping section is prestressed elastically radially outward to define an inside diameter larger than a predetermined nominal diameter of a line cable when in the mounting position and is deformable elastically radially inward to define the inside diameter smaller than or equal to the predetermined line diameter of the line cable when in the operating position;
a cable bushing sleeve having an interior space through which the line cable may pass; and
a clamping sleeve releasably fastened to the cable bushing sleeve and moveable between a first position in relation to the cable bushing sleeve and a second position in relation to the cable bushing sleeve;
wherein, in the first position, the clamping sleeve and the cable bushing sleeve interact such that the clamping section is in the mounting position and the line cable passing through the interior space in the cable bushing sleeve can move relative to the cable bushing sleeve; and wherein, in the second position, the clamping sleeve and the cable bushing sleeve interact such that the clamping section is in the operating position and a clamping effect is exerted on the line cable passing through the interior space in the cable bushing sleeve, the line cable in the cable bushing sleeve being fixed against relative movement in relation to the cable bushing sleeve by the clamping effect.

* * * * *